United States Patent
Griessbach

(10) Patent No.: US 6,587,474 B1
(45) Date of Patent: Jul. 1, 2003

(54) DATA BUS FOR MULTIPLE COMPONENTS

(75) Inventor: Robert Griessbach, Weyarn (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/254,391

(22) PCT Filed: Aug. 27, 1997

(86) PCT No.: PCT/EP97/04672

§ 371 (c)(1),
(2), (4) Date: Jul. 23, 1999

(87) PCT Pub. No.: WO98/09845

PCT Pub. Date: Mar. 12, 1998

(30) Foreign Application Priority Data

Sep. 7, 1996 (DE) .......................................... 196 36 442
Sep. 7, 1996 (DE) .......................................... 196 36 441
May 15, 1997 (DE) .......................................... 197 20 401

(51) Int. Cl.[7] ......................................... H04L 12/413
(52) U.S. Cl. .................... 370/446; 359/118; 359/136
(58) Field of Search .................... 370/445, 446, 370/447, 431, 461, 462, 520, 503, 507, 509, 514, 437–439, 443, 444, 449; 359/118, 135, 136, 137

(56) References Cited

U.S. PATENT DOCUMENTS

| | | | | | |
|---|---|---|---|---|---|
| 4,809,257 A | * | 2/1989 | Gantenbein | ............... | 359/136 |
| 4,885,742 A | * | 12/1989 | Yano | ..................... | 370/408 |
| 4,942,571 A | * | 7/1990 | Moller | ..................... | 370/407 |
| 5,172,374 A | * | 12/1992 | De Cristofaris | ........... | 370/425 |
| 5,309,436 A | | 5/1994 | Hirano et al. | ............... | 370/85.1 |
| 5,319,642 A | * | 6/1994 | Ota | ........................ | 370/447 |
| 5,406,091 A | * | 4/1995 | Burba | ........................ | 250/551 |
| 5,625,626 A | * | 4/1997 | Umekita | ..................... | 380/448 |
| 5,802,061 A | * | 9/1998 | Agarwal | ..................... | 370/461 |
| 5,854,700 A | * | 12/1998 | Ota | ........................ | 359/136 |
| 6,125,397 A | * | 9/2000 | Yoshimura | ................. | 709/235 |

FOREIGN PATENT DOCUMENTS

| | | |
|---|---|---|
| DE | 31 50 313 C2 | 8/1983 |
| DE | 34 24 866 A1 | 1/1986 |
| DE | 37 37 554 A1 | 5/1989 |
| DE | WO 89/09146 | 10/1989 |
| DE | 38 25 099 C2 | 1/1990 |
| DE | 39 36 894 A1 | 5/1991 |
| DE | WO 91/06447 | 5/1991 |
| DE | 195 03 214 C1 | 2/1995 |
| DE | 195 15 633 A1 | 10/1996 |
| GB | 2 290 682 A | 1/1996 |
| WO | WO 85/03826 | 8/1985 |
| WO | WO 96/08097 | 3/1996 |

OTHER PUBLICATIONS

"Interfaces und Datennetze", Gerhard Schnell and Konrad Hoyer; Friedr. Vieweg & Sohn Verlagsges. mbH, Braunschweig, 1989, pps. 24–29.

* cited by examiner

Primary Examiner—Dang Ton
Assistant Examiner—Ricardo M. Pizarro
(74) Attorney, Agent, or Firm—Crowell & Moring LLP

(57) ABSTRACT

In a data bus which is shared by several components, the components possess a hierarchical transmission token and are synchronized by a synchronization pulse. A clock signal of the synchronization pulse has a rate which is between the duration of transmission of the component with the highest priority token and the cumulative duration of transmission of all components.

18 Claims, 3 Drawing Sheets

DATA BUS FOR MULTIPLE COMPONENTS

Figure 1:
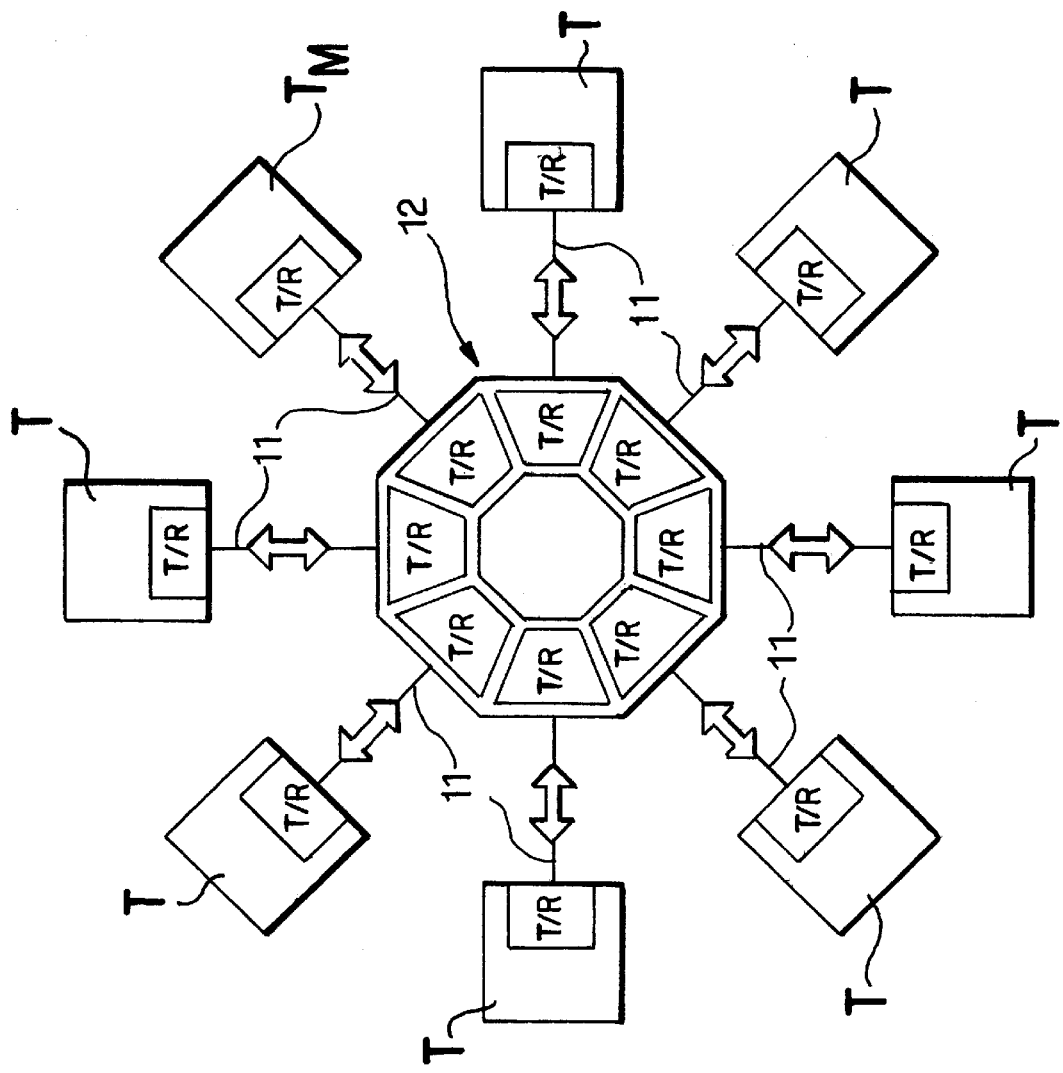

This application is related to the Applicant's application Ser. No. 09/254,483, filed May 26, 1999.

The invention refers to a data bus with several components.

Such data buses are becoming increasingly wide spread in use. In buildings, for example, they serve to interconnect the different electrical switches, energy consuming devices and such other similar devices of a building, and to transmit control commands among the components. Further applications include networking of machine control systems in an industrial environment, (for example, a production line, data buses in airplanes for the various actuation and control components), as well as in land vehicles having corresponding devices for switching, transforming and consuming electrical energy.

Two different designs of data buses exist. One design concerns the synchronized model in which the bus master emits a synchronizing pulse with a predetermined elementary frequency. In the time span between two different timing pulses, the components access the data bus within a defined time frame. The point in time of their respective transmission authorization is, as a rule, determined by their transmission priority, and every component transmits in a defined time frame after the output of the synchronizing pulse.

Such a data bus possesses the advantage of being able to function without data collisions among the different components, since every component has a defined time frame available for its data transmission. On the other hand, such a data bus is relatively slow because the cycle time is determined by the number of the components; hence, a great number of components results in a lowering of the fundamental frequency. In addition, there is the difficulty of supplying with one and the same data bus concept not only a defined number of components, but rather a number of components that deviates from the defined number. Thus time frames are also made available for the maximum number of components which can be integrated into the data bus, which results in a reduction of the corresponding cycle time.

The second data bus concept is known as an asynchronous data bus. Here the components transmit their data in the order of their respective, hierarchy-dependent transmission authorization. As a result, the component with the highest priority rank can transmit to the data bus at all times, which has the disadvantage that this component can jam the data bus, i.e., it becomes impossible to transmit data for those components that rank lower in the priority-dependent transmission hierarchy. In addition, the problem exists that components may collide, because depending on the signal run times several components may want to access the seemingly free data bus simultaneously, and they are informed of the transmission of another component only while they are already transmitting their own signal. This possibility requires costly collision prevention strategies, such as CSMA/CD.

The invention is based on the task to create a data bus of the type mentioned in the introduction, which combines the advantages of a synchronous and an asynchronous data bus.

The invention solves this task via the characteristics of Patent claim 1.

The data bus, which conforms to the definition of the invention, possesses characteristics of both a synchronous and an asynchronous data bus. The synchronizing pulse is an unequivocal characteristic of a synchronous data bus. The declared cycle time is found neither on an asynchronous nor on a synchronous data bus. The cycle's time span is located between the transmission time span of the component with the highest priority ranking and the cumulative transmission time of all components. On a data bus with 100 components, this time span is chosen so that for example the 50 components with the highest priority all may transmit to the data bus during one cycle time, while in this case the lower ranked components cannot gain access to the data bus.

The number 50, i.e., approximately half of the maximum number of components, is to be understood merely as a point of reference. This number may range from 2 to 95 components in a given application. Crucial is only that the cycle time is indeed significantly smaller than the cumulative transmission time of all components. Therefore, it is never possible that all components can transmit to the data bus in one cycle. On the other hand, this eliminates the aforementioned problem of providing time frames for possibly non-existent bus components, and a cycle time is obtained which fulfills the respective requirements.

By allocating a hierarchical transmission authorization order, the collision prevention algorithms, which are typical for an asynchronous data bus, become superfluous. At the same time, by choosing the transmission time, as described, it is assured that among components that follow in the transmission hierarchy, in case the previous component does not transmit, only those components access the data bus which are actually transmitting, and the components which do not use the data bus for their transmission during the cycle are taken into consideration only insofar as it is confirmed that they are indeed not transmitting. This is achieved by taking into consideration the signal run times on the data bus.

The basic principle behind the invention can be described as follows:

In theory, every component receives the chance to transmit data to the data bus. However, in actuality its ability to transmit data is subject to a hierarchical order. The later a component is designated to transmit within a given cycle, the lower is its ranking in the transmission hierarchy. If the time of its transmission lies after the completion of the cycle, then it may transmit at the earliest in the next cycle. If at that point a corresponding number of components with a higher ranking are once more transmitting, then this particular component cannot even send at this point in time, etc. Its ability to transmit thus depends in every transmission cycle on how many other, higher ranking components are transmitting.

The cycle time is determined depending on how many components must have the option to transmit in every cycle. The cycle time is adjusted for the number of these privileged components. Whether the other components do get the chance to transmit during a cycle depends entirely on how many of the privileged components indeed do (not) transmit, and on how many other components are transmitting which have a higher priority rank.

During a component's transmission, it may happen that the component's transmission is being completed at the same time as the transmission of the synchronizing pulse takes place, i.e., that it coincides with the end of the cycle, or even takes place after it. For this situation, different solutions may be used within the framework of the invention. One solution consists of delaying the synchronizing pulse until the component has completed its transmission.

In order to be able to maintain the elementary frequency despite this occurrence, the following synchronizing pulse is calculated, in terms of its output time, in such a way that it is synchronized with the next to last previous synchronizing pulse. If one designates the next to last previous synchronizing pulse as the first pulse and the following ones as pulses number two, three, etc., then the interval between the first and the second pulse is longer than the cycle time, while the phase between the second and the third pulse is shorter than the cycle time. If once more a component is transmitting to the data bus at the time of the output of the third synchronizing pulse, then the third synchronizing pulse is also emitted with a delay. The following synchronizing pulse, i.e., in this case the fourth one, compensates for the time overrun.

An alternative solution provides that the component does not transmit if the end of its transmission coincides with the end of the cycle, or if its transmission would end after the end of the cycle. This solution has the advantage of an always constant cycle time. Therefore adjustments, such as those described in the first alternative, are not necessary.

Further design developments of the invention result from the additional patent claims and are explained in greater detail with the help of the drawings. Depicted are in FIG. 1 schematically a data bus for a vehicle which possesses several devices that serve the safety of the passengers, FIG. 2 a diagram for explaining the data exchange on the data bus depicted in FIG. 1 and FIG. 3 a data exchange for an alternative to the data bus from FIGS. 1 and 2.

Figure 2:
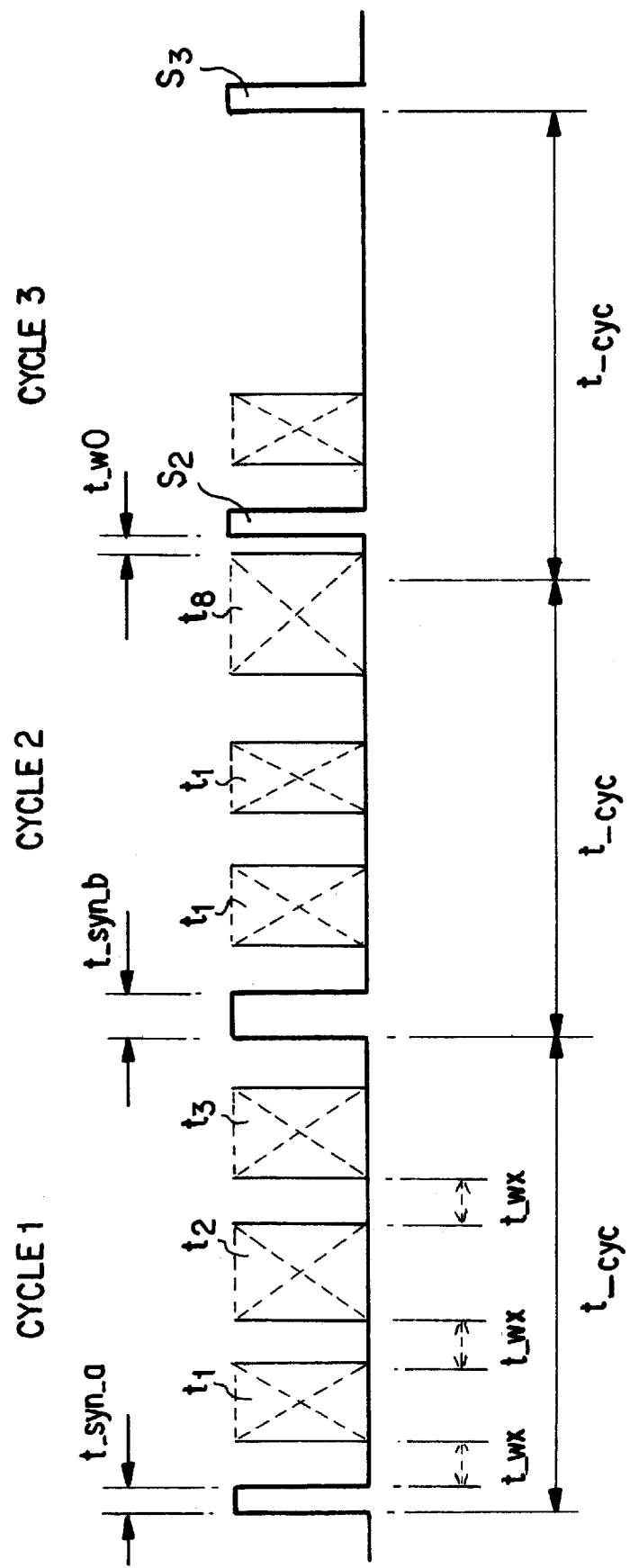

The data bus in FIG. 1 and 2 consists mainly of a single beam wave guide 11 (also referred to as a BWG-fiber). The individual components T are connected with each other via the BWG-fiber and via an active star coupler 12.

To connect to the beam wave guide bus 11, each component T possesses a transmit-receive T/R module, into which a transmission and reception diode, as well as a beam splitting lens are integrated (not shown). One of the transmit-receive modules $T_M$ performs the function of a bus master. The beam wave guide line is made up of the beam wave guide fiber and is operated bidirectionally. The active star coupler 12 is primarily made up of the transmit-receive T/R modules. Each component has a transmit-receive (T/R) module. The modules are configured in the star coupler 12 in a manner such that the data transmitted by one component is distributed to all other branches of the bus system. These branches are formed primarily by the transmit-receive modules of the star coupler 12 and the corresponding transmit-receive modules of the respective components.

The signals emanating from the respective transmitting component of the bus characterize conditions or respectively measured values from sensors as a part of the components. Moreover, actuators, such as air bags and safety belt tighteners, are connected to the bus system as additional components. The actuators receive the data which is supplied by the sensors and calculate, each on its own, the necessary actions. At the same time, should the bus master, if the occasion arises, recognize a critical condition in one of the components, it responds to this situation by the output of an initialization pulse, which differs in terms of its duration from the initialization pulse that the bus master usually emits.

One of the components serves as the bus master. For this function, the component designated $T_M$ is provided. This component transmits a synchronizing pulse in regular time intervals, as is depicted in the diagram of FIG. 2. With a predetermined transmission priority order, the components receive the authority to transmit. When a component finds itself in a situation where no condition is indicated that is critical for the safety of the passengers, then as a rule the component does not transmit. In this context, the term "as a rule" does not encompass the initialization process after starting the vehicle, at which time the components identify themselves via an identification key vis-à-vis the other components and the bus master. The components, however, report back cyclically in relatively long time intervals, and insofar as they do not actually transmit data they emit a brief signal demonstrating their presence.

If a condition exists, which is not critical for the safety, i.e., none of the components are transmitting, then the next synchronizing pulse, upon completing the basic cycle is transmitted by the bus master.

In a condition, which is critical for the safety of the passengers, when for example the bus' component with the highest transmission priority is activated, then the data bus is occupied first by this component's data $t_1$. The component with the next highest priority ranking now transmits its data $t_2$. Corresponding action takes place with regard to the component with the data $t_3$. Every data t possesses, as is known from DE 34 35 216 A, an identification key, and on the basis of this identification key, the other components can identify the origin of the data and if necessary receive it. It is also possible, to transmit a signal to the data bus, which is meant for only one specific addressee. Upon the completion of the phase of the basic cycle, and if no component transmits at this point, then the next synchronizing pulse s is transmitted.

However, if a component is transmitting at the end of the cycle, then the output of the synchronizing pulse is delayed. This case is depicted in the time span designated as cycle 2. In this, the delay $t_{-WQ}$ has to be shorter than the time span $t_{-W_q}$ which exists in between the transmission of those components which follow each other.

The following synchronizing pulse, in this case here $s_3$, is synchronized with the first synchronizing pulse $s_0$, which is emitted at the outset of cycle 1, and the synchronizing pulse $s_1$. The time span between the synchronizing pulse $s_2$, and $s_3$, is smaller than the cycle time.

Figure 3:
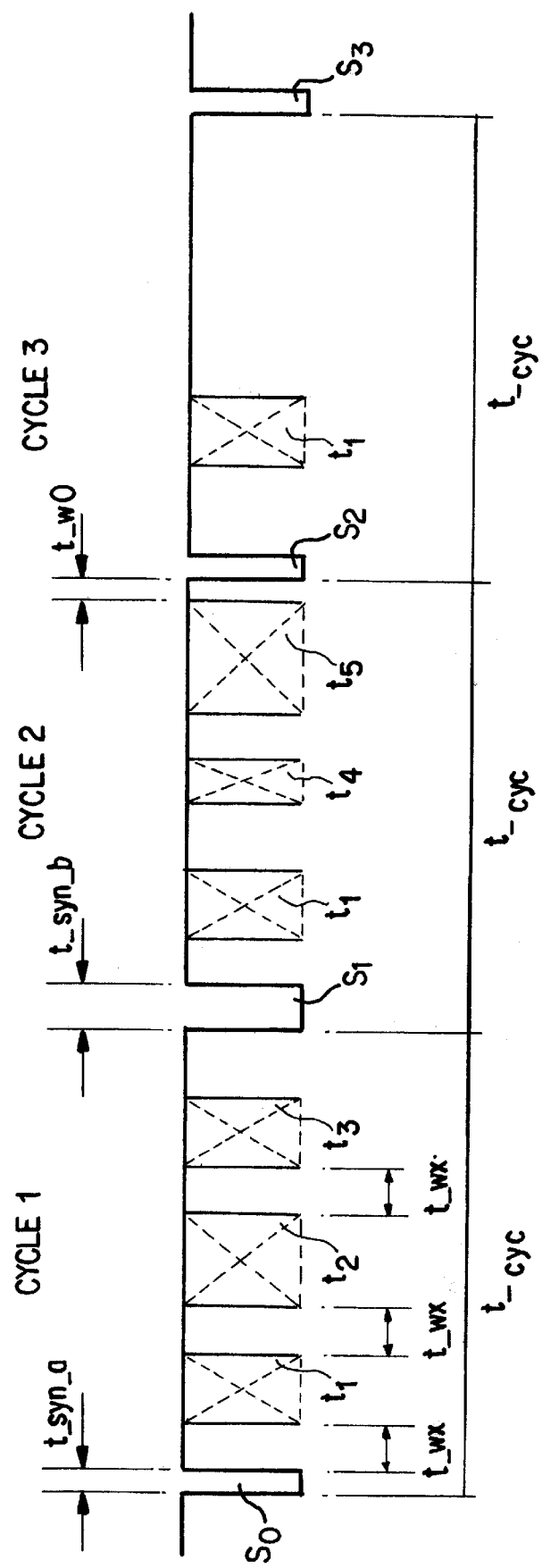

The data bus which is not individually shown but whose data traffic is depicted in FIG. 3 is basically configured in the same way as the data bus in FIG. 1. Here too the next synchronizing pulse s is emitted at the end of the cycle time $t_{-cyc}$.

Should a component be in the process of transmitting its signal at the end of the cycle time $t_{-cyc}$, then this component's transmission is cut off. For this, every component calculates the (actual) time which it has available for its transmission within the cycle time, and it does not transmit if the duration of its transmission $t_1, t_2, t_3, \ldots$ does not come at $t_{-wx}$ before the completion of the cycle time $t_{-cyc}$. The value $t_{-wy}$ represents the maximum signal run time on the data bus.

FIGS. 2 and 3 show additional characteristics of the data bus. In cycle 1, it is assumed that components $T_1, T_4$ and $T_3$ are active transmitters. The time of transmission for the component is calculated according the end of the transmission of the hierarchically preceding component and the component's own position within the hierarchy. Among two transmitters which immediately follow one another the time interval is minimal and equals $t_{wx}$. The time interval between two transmitters increases with increasing distance within the hierarchy. Therefore, the interval between $t_1$ and $t_4$ is larger than the interval between $t_1$ and $t_2$ and smaller than the interval between $t_4$ and $t_3$. In this way, every component receives the chance to transmit if the need arises, insofar as it is authorized to transmit during the cycle time. Otherwise it transmits only then when an emergency arises. Nevertheless, the time of the transmission is precisely determined. Collisions are therefore avoided. The time of transmission for every component is the earliest possible one.

In case of an alarm, the duration of the synchronizing pulse is extended. As a consequence, a protection is achieved against the spurious release of a safety device. The safety device is released only when a critical condition is indicated by the (extended) synchronizing pulse ($t_{\_syn\_b}$ instead of $t_{\_syn\_a}$) and when in addition it receives a corresponding signal from a crash sensor. In case of a crash, the safety device is not released in the cycle in which the signal from the crash sensor appears for the first time, but instead in the following cycle at whose beginning a critical condition for the entire system is signaled via the extended synchronizing pulse, and the real danger is indicated by the crash sensor which continues to transmit.

Furthermore the possibility exists to access such data buses, if no case of alarm exists, with components that are assigned to non-safety-critical devices. Such devices, for example, may be placed in a door of the vehicle and are used for opening and closing the windows, adjusting the outside mirror or heating the door locks. Precondition for this is merely a priority ranking in the data bus' transmission authorization hierarchy which is lower than that of the devices that serve the safety of the passengers, so as not to interfere with the latter in the case of an emergency.

In this way, for the first time it becomes possible to allow devices, which are responsible for the safety of the passengers of an automobile, to communicate with each other via a data bus.

What is claimed is:

1. Data bus for multiple components, comprising:
   a beam wave guide;
   a plurality of components coupled to the beam wave guide; and
   an active star coupler coupled to the beam wave guide; wherein
      the components have a predetermined hierarchical transmission authorization;
      an order of transmissions of the respective components is controlled via a synchronizing pulse, said components transmitting data via said data bus between consecutive synchronizing pulses in an order determined according to said hierarchical transmission authorizations; and
      a cycle time between consecutive synchronizing pulses resides between a duration of a transmission of a component having a highest priority ranking and a cumulative transmission time of all components.

2. The data bus according to claim 1, wherein if a higher ranking component does not transmit, a lower ranking component has a transmission authorization in a time interval which is measured from a transmission time of a component having a highest priority ranking, based on a maximum transmission time of a signal on the data bus.

3. The data bus according to claim 1, wherein a component does not transmit if a time period remaining between a transmission authorization for said component and a time for outputting a following synchronizing pulse is shorter than a duration of transmission of the component.

4. The data bus according to claim 2, wherein a component does not transmit if a time period remaining between a transmission authorization for said component and a time for outputting a following synchronizing pulse is shorter than a duration of transmission of the component.

5. The data communication network according to claim 1, wherein the plurality of subscriber components are interconnected via the active star coupler.

6. The data bus according to claim 1, wherein the components send a status signal in a normal mode.

7. The data bus according to claim 2, wherein the components send a status signal in a normal mode.

8. The data bus according to claim 1, wherein the synchronizing pulse has different durations which correspond to different conditions of devices assigned to the data bus.

9. The data bus according to claim 2, wherein the synchronizing pulse has different durations which correspond to different conditions of devices assigned to the data bus.

10. The data bus according to claim 8, wherein the conditions of devices assigned to the data bus are defined by a transmission mode of a specific component.

11. The data bus according to claim 1, wherein the synchronizing pulse is transmitted by a component.

12. The data bus according to claim 2, wherein the synchronizing pulse is transmitted by a component.

13. A method of operating a data network which includes a plurality of subscriber components coupled in data communication via a data bus that is controlled by a bus master, said method comprising:
    said bus master generating a train of synchronization pulses;
    between consecutive synchronization pulses, said subscriber components transmitting data via said data bus in an order determined according to a predetermined transmission priority hierarchy;
    wherein a cycle time between consecutive synchronization pulses is greater than a duration of a transmission of a subscriber component having highest priority and less than a cumulative transmission time necessary for all subscriber components to transmit via the data bus.

14. The method according to claim 13, wherein a particular subscriber component does not transmit if a time remaining prior to expiration of a current cycle is less than a duration required for transmission by the subscriber component.

15. The method according to claim 13, wherein:
    following a particular synchronization pulse, a first next consecutive synchronous pulse is delayed if a component has not completed transmission of data prior to the end of a current cycle; and
    a second next consecutive synchronization pulse is generated at a time measured from said particular synchronization pulse.

16. A data communication network having a plurality of subscriber components coupled in data communication via a data bus that is controlled by a bus master, wherein:
    said bus master generates a train of synchronization pulses;
    between consecutive synchronization pulses, said subscriber components transmit data via said data bus in an order determined according to a predetermined transmission priority hierarchy; and
    a cycle time between consecutive synchronization pulses is greater than a duration of a transmission of a subscriber component having highest priority and less than a cumulative transmission time necessary for all subscriber components to transmit via the data bus.

17. The data communication network according to claim 16, wherein a particular subscriber component does not transmit if a time remaining prior to expiration of a current cycle is less than a duration required for transmission by the subscriber component.

18. The data communication network according to claim 16, wherein:
following a particular synchronization pulse, a first next consecutive synchronous pulse is delayed if a component has not completed transmission of data prior to the end of a current cycle; and
a second next consecutive synchronization pulse is generated at a time measured from said particular synchronization pulse.

* * * * *